United States Patent [19]
Epstein

[11] 3,732,597
[45] May 15, 1973

[54] EASILY INSTALLED FAN BELT
[75] Inventor: Martin Epstein, Rockville Center, N.Y.
[73] Assignee: The Raymond Lee Organization, Inc., New York, N.Y.
[22] Filed: June 29, 1971
[21] Appl. No.: 157,884

[52] U.S. Cl..............24/31 B, 24/31 V, 24/230 SL, 285/319
[51] Int. Cl..............................................F16g 7/04
[58] Field of Search....................24/230 R, 230 F, 24/230 SL, 230 CF, 31 B, 31 C, 31 L, 31 R; 339/258 S, 255 P, 261; 385/7, 317, 319; 74/231 P, 231 J, 232

[56] References Cited
UNITED STATES PATENTS

| 3,461,511 | 8/1969 | Perina | 24/31 V |
|---|---|---|---|
| 3,092,885 | 6/1963 | Guanche | 24/230 CF |
| 3,245,698 | 4/1966 | Fromknecht | 24/230 SL |
| 2,061,961 | 11/1936 | Culver et al. | 339/258 S |

Primary Examiner—James T. McCall
Assistant Examiner—Darrell Marquette
Attorney—Richard S. Sheeve, Jr.

[57] ABSTRACT

An automotive fan belt having in cross section the general shape of a T and having opposite ends provided with snap fasteners or screw clamps for joining said ends.

1 Claim, 6 Drawing Figures

PATENTED MAY 15 1973  3,732,597

INVENTOR.
MARTIN EPSTEIN

EASILY INSTALLED FAN BELT

PRIOR ART

The conventional belt used for fan drive in an automobile is a flexible elongated endless belt having the general shape of a T in cross section. It can be installed only with the use of hand tools.

SUMMARY OF THE INVENTION

In my invention I employ a flexible elongated belt having opposite ends and retaining the general cross sectional shape of a T. Detachable means cooperating with the ends enables same to be interconnected while the belt is installed whereby no hand tools are needed.

DETAILED DESCRIPTION OF PREFERRED EMBODIMENTS

Figure 1:
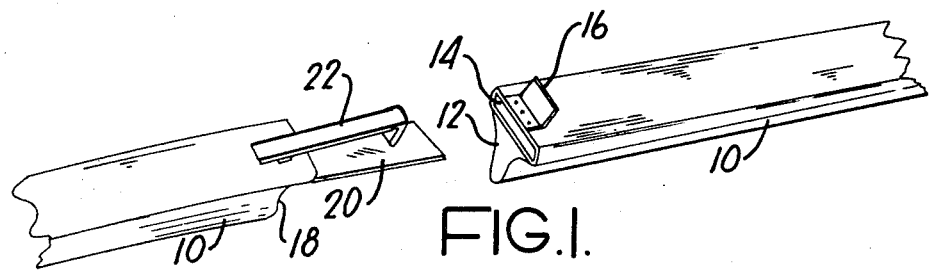
FIG. 1 is a perspective view of one form of my invention with the ends detached.
Figure 2:
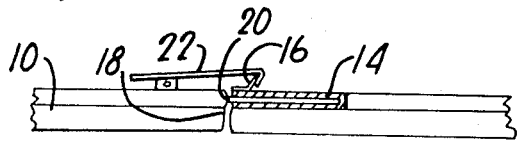
FIG. 2 is a side view of the invention of FIG. 1 with the ends engaged.

Referring now to FIGS. 1 and 2, a fan belt 10 is flexible, elongated relative non-stretchable and has a cross section in the general shape of a T. The belt has two opposite ends. One end 12 has a longitudinally extending horizontal recess 14 in the flat top portion of the belt and is surmounted by a transversely extending inclined catch plate 16. The other end 18 has a flat horizontal forwardly extending finger 20 surmounted by a forwardly extending pivotable catch 22. The two ends can be engaged for purposes previously described by placing the finger in the recess and causing the catch to engage the catch plate.

Figure 3:
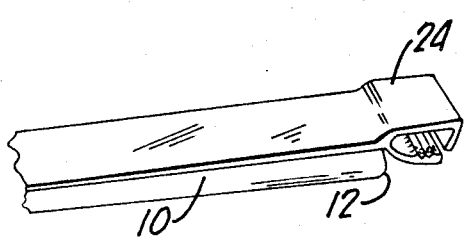
FIG. 3 is a perspective view of another form of my invention with the ends detached.
Figure 4:
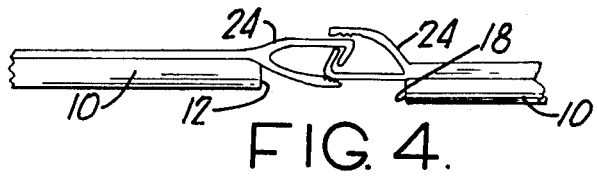
FIG. 4 is a side view of the invention of FIG. 3 with the ends engaged.
Figure 5:
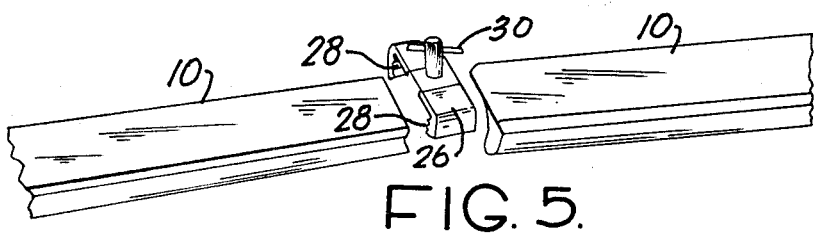
FIG. 5 is a perspective view of yet another form of my invention with the ends detached.

Referring now to FIGS. 3 and 4, ends 12 and 18 are each provided with manually operable catches 24.

Figure 6:
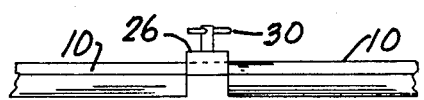
FIG. 6 is a side view of the invention of FIG. 5 with the ends engaged.

Referring finally to FIG. 6, a screw controlled clamp 26 has opposite inner surfaces carrying gripping teeth 28 and is operable by manual rotation of screw arm 30.

While I have described my invention with particular reference to the drawings, such is not to be considered as limiting its actual scope.

Having thus described this invention, what is asserted as new is:

1. In combination: an elongated flexible, relatively non-stretchable belt having opposite ends:
    and means for detachably securing together said opposite ends to form an endless belt;
    wherein the belt is T-shaped in cross section and said securing means detachably engages only the flat top portions of said T-shape, leaving the stem of the T-shape free;
    one end of said belt having a longitudinally extending recess in its top portion surmounted by a transversely extending catch plate;
    the other end having a flat forwardly extending finger attached to its top portion to enter said recess, and a pivotal catch surmounting the finger to engage the catch plate.

* * * * *